May 31, 1932.    W. A. MARRISON ET AL    1,860,936
ELECTRICAL CONTROL SYSTEM
Original Filed Feb. 24, 1928
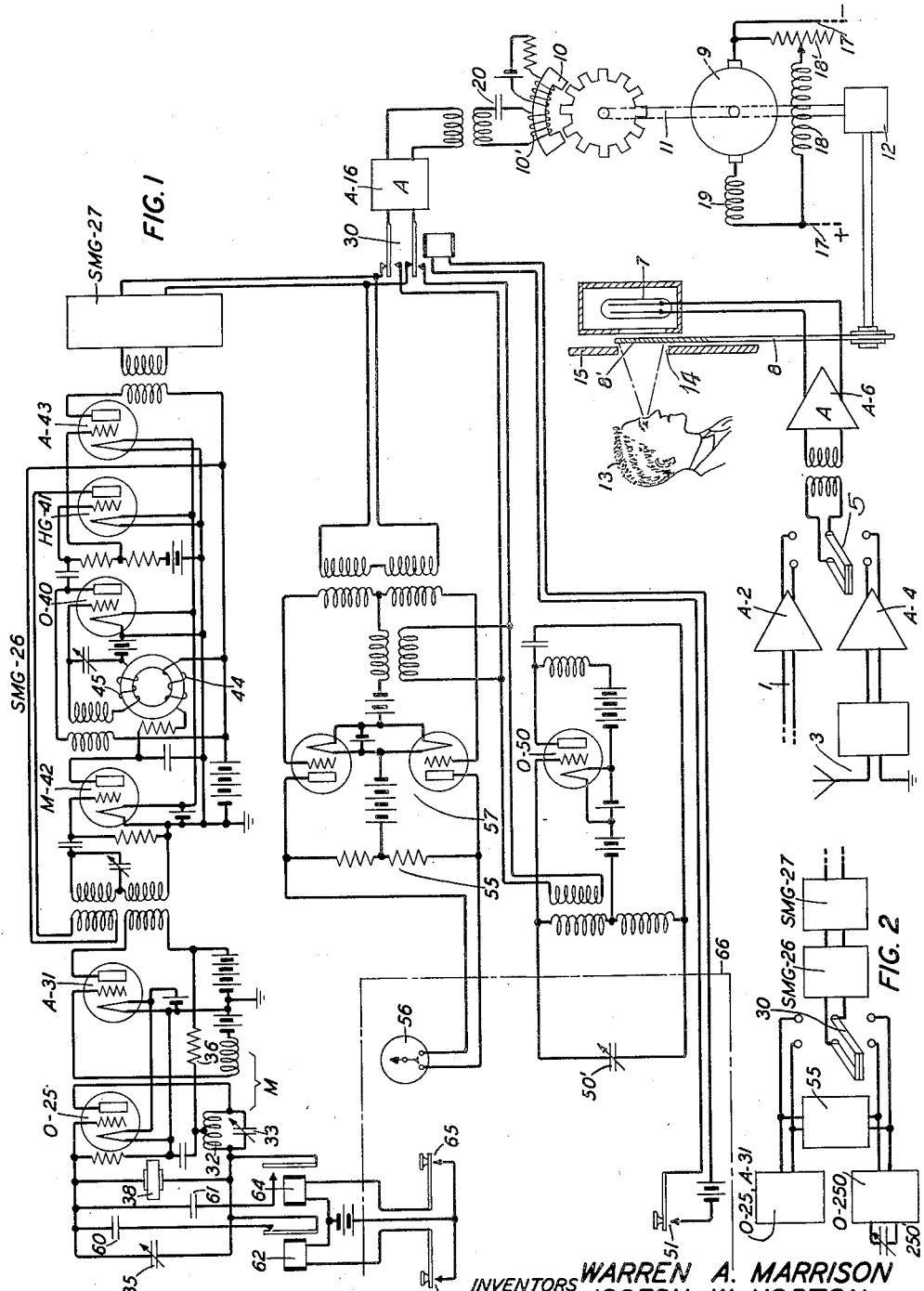
INVENTORS WARREN A. MARRISON
JOSEPH W. HORTON
BY Chr Sprague
ATTORNEY Patented May 31, 1932

1,860,936

UNITED STATES PATENT OFFICE

WARREN A. MARRISON, OF ORANGE, NEW JERSEY, AND JOSEPH W. HORTON, OF CAMBRIDGE, MASSACHUSETTS, ASSIGNORS TO BELL TELEPHONE LABORATORIES, INCORPORATED, OF NEW YORK, N. Y., A CORPORATION OF NEW YORK

ELECTRICAL CONTROL SYSTEM

Original application filed February 24, 1928, Serial No. 256,784, and in Canada December 6, 1928. Divided and this application filed May 21, 1930. Serial No. 454,276.

The present invention relates to electrical control and transmission, particularly of a type involving the control of the frequency or speed of actuation of one or more mechanisms.

Objects of the invention are:

The accurate control of the frequency or speed of actuation of apparatus for any purpose, and The accurate control and maintenance in step with each other of two or more mechanisms located in different places, especially in conjunction with the transmission between two or more places and the reproduction at the respective receiving points of electrical effects where the operating speed of the mechanisms at these points enters into the reception or reproduction of these effects.

The invention, though not limited to particular uses, is particularly adapted to, and will be described in connection with, the electrical transmission and reproduction of visible effects at one or more separated stations or locations, such, for example, as in television systems.

For a detailed description of certain apparatus and systems that have been used heretofore for television purposes, reference is made to The Bell System Technical Journal for October, 1927, Vol. VI, pages 551–652. In connection with the systems there described it was pointed out that in any practical television system there must be a very close correspondence in time of operation between the translating means at a transmitter for translating the space relations of an image into a time sequence of electrical variations and the translating means at the receiver for reproducing in their special relations the variations that are received electrically at the receiving point. In order to maintain these rates of translation at the two stations alike to the required degree of accuracy it has been the practice, as indicated in the publication referred to, to transmit between the sending and receiving stations electrical variations for maintaining constantly a control over the speed of apparatus at certain of the stations of the system. For example, the translations, referred to as taking place at the respective stations, may be accomplished by the use of continuously rotating members, in which case the speed of rotation has been maintained constant to a sufficient degree of accuracy by transmitting between stations of the system, electrically controlled waves which serve at all times to determine the speed of rotation of the translating members.

In order to reproduce the visible effects at a receiving point in the desired relationships it is necessary to do more than maintain the speed of operation of the receiving apparatus exactly in step with that at the sending station. Maintenance of the speed alone to the required degree of accuracy will serve to reproduce the visible effects which so far as their continuity in time are concerned are the counterparts of the image to be transmitted, but unless there is a point-to-point correspondence in the space relation between the transmitted and received images, the received image will suffer distortion. For instance, the different parts of the image as viewed at the receiver may be out of their proper relation with respect to each other. This will be apparent when it is considered that each portion of the image as translated into electrical variations at the transmitter should in order to obtain the desired image be reproduced at the receiver at the corresponding point in the field or frame of the viewing screen. If, for example, the electrical variations which represent the upper left point of the image to be transmitted are reproduced at the receiver at, say, the left hand margin of the viewing frame but half way down instead of at the upper margin, then assuming the proper speed relations to be maintained at sending and receiving stations, the image will be reproduced, but the image of the lower part of the view transmitted will appear above the image of the upper part.

The technique of operating a television system, therefore, comprises not only maintaining the proper speed relations between sending and receiving stations, but also the proper framing of the image at the receiving point, which means that there must be a proper phase relation or point correspondence between the translating apparatus of the sending and receiving stations. Applicants have devised a method and system of control of the translating apparatus which enables the necessary speed relations between these apparatus to be accurately maintained and the phase relations or point to point correspondence to be changed in an expeditious manner as conditions may require, so that the received picture may be quickly and accurately framed.

In the embodiment of the invention to be more clearly described hereinafter, separate and independent speed determining means are used at the respective stations for controlling the speed of the translating members. These speed controlling mechanisms may take the form of synchronous motors driven from constant frequency generating systems such as oscillators controlled by piezo electric crystals. As is described in our paper in the Proceedings of the Institute of Radio Engineers for February 1928, pages 143 to 153, we have devised a technique for the operation of piezo controlled oscillators which is effective to maintain their frequencies constant to a high degree of precision for any desired length of time, and also methods for securing sub-multiples of these frequencies. Frequencies so obtained are utilized in the present embodiment to operate synchronous motors at the respective stations. By the use of this type of frequency control the translating means at the various stations may be maintained to the required degree of correspondence and speed.

In conjunction with the frequency maintaining systems at the respective stations there is provided at certain of the stations, in accordance with the invention, auxiliary frequency control apparatus which may temporarily be substituted for the primary frequency determining system and which may be readily controlled to change the speed of the translating means to a sufficient degree and for the necessary time to bring the phase position of the translating means at the particular station into correspondence with that of another station. As will be described more fully hereinafter, this auxiliary control means for giving a relatively rough adjustment of the phase position of the translating means may be supplemented by a fine adjustment means associated with the primary speed control circuits so that both large and small movements of the perceived image may be executed in an expeditious manner to bring the image quickly and accurately into its properly framed position.

Other objects and aspects of the invention will be apparent from the following description and claims.

The invention will be more fully understood from the following detailed description in connection with the accompanying drawings in which Fig. 1 illustrates a typical embodiment of the invention as applied to a television receiving system for cooperating with a distantly located transmitting station (not shown), and Fig. 2 illustrates a modification of the system of Fig. 1.

The television system in which the transmitting station and the receiving system are included may be, for example, of the general type disclosed in the above mentioned publication in The Bell System Technical Journal.

At the transmitter (not shown) the subject may be scanned directly by a rapidly moving spot of light as described in connection with Figs. 2 and 3 on pages 562 and 563 of that publication. The scanning apparatus then comprises a disc rotating approximately eighteen revolutions per second, the disc having fifty small apertures arranged in the form of a spiral. Light from an arc is condensed by a lens to intensely illuminate a limited area in the path of the moving apertures; and a slender, intense beam of light passes through each aperture as it moves across the illuminated area. A frame in front of the disc permits light to emerge from only one aperture at a time and a lens in front of the disc focuses an image of this moving aperture on the subject. As a result of this arrangement the subject is completely scanned in a series of successive parallel lines by a rapidly moving spot of light, once for each revolution of the disc. Resulting light diffusely reflected from the subject falls on photoelectric cells, which operate effectively in parallel into an amplifier system. The current output from the photoelectric cells is proportional to the received light, and therefore to the brightness of the various elemental areas of the subject as it is traced over by the scanning beam.

The variations in this output current are highly amplified and transmitted over a wire channel 1 to a receiving amplifier A—2, or over a radio channel including radio receiver 3 to a receiving amplifier A—4. From amplifier A—2 or from amplifier A—4, in accordance with the position of switch 5, the received variations are transmitted to amplifier A—6, in which they are amplified and impressed on a direct current for operating a neon glow discharge lamp 7 at a brightness proportional to the picture current. In front of the neon lamp is a disc 8 similar to the scanning disc at the transmitting station and likewise provided with fifty small apertures such as 8' arranged in the form of a spiral. A direct-current driving motor 9 is controlled, by means including a mechanically coupled synchronous motor 10, to rotate disc 8 in synchronism with and in proper phase relation to the scanning disc at the transmitter. Means, in accordance with the present invention, for obtaining this synchronism and proper phase relation are described hereinafter. A shaft 11 for motors 9 and 10 is shown as connected to disc 8 through gearing 12. The gearing may be considered as having a unity ratio. The disc 8 may be mounted directly on shaft 11 if it is desired to omit the gearing.

An observer 13 looks at a small rectangular opening 14 in an opaque screen 15 forming a frame in front of the disc 8 and lamp 7, the opening 14 being of such dimensions that only one aperture of the disc can appear in the field of view at a time. As the disc rotates, its apertures pass across the opening 14 one after the other in a series of parallel lines, each line displaced a little from the preceding one until in one revolution of the disc the entire field has been covered. At any instant, there is at some position in the field of view of observer 13 defined by opening 14 a small aperture such as 8' illuminated by lamp 7 proportionally to the brightness of an illuminated spot in the same relative position on the distant subject. Consequently, the observer sees an image of the distant subject reproduced in the frame opening 14.

The television system as set forth in the detailed description down to this point is the same as the system described in the above mentioned publication in The Bell System Technical Journal.

In accordance with the present invention, necessity for a synchronizing transmission channel between the sending station and the receiving station is avoided by employing separate and independent means of a character about to be described for independently maintaining the speed of the scanning discs at the sending station and the receiving station, respectively, so nearly at a constant value which is made the same for the cases of the two stations, that the discs are maintained in synchronism without transfer of synchronizing power between the stations. The means at the receiving station, for maintaining the speed of motor 9 and disc 8 sensibly constant, comprises a constant frequency source for delivering power to a stator winding 10' of synchronous motor 10 through amplifier A—16. The motor 9 is supplied with power from line 17. Motor 9 has a shunt field winding 18, a shunt field rheostat 18', and a cumulative series field winding 19. This motor supplies the steady component of power required for driving disc 8. The fluctuating component is supplied by motor 10, which is of the inductor type. At times the machine 10 may act as a generator, opposing the motor 9, in which case the power generated in machine 10 is dissipated as heat in the machine 10 and in the amplifier A—16. The motor 10 may be, for example, a 240-pole motor with a rotor having 120 teeth and with a stator having a direct current exciting winding in addition to the winding 10'. A condenser 20 in series in the circuit of winding 10' tunes the circuit to a frequency a little higher than the synchronous frequency of the machine 10. This tends to prevent hunting as described in the patent to E. R. Horton, No. 1,696,248, dated December 25, 1928. The constant frequency source just mentioned for delivering power to winding 10' through amplifier A—16, consists of a 50-kc. piezo-electric crystal controlled space discharge oscillator O—25 of the Hartley type followed by two controlled frequency oscillators or submultiple frequency generators SMG—26 and SMG—27 operating at frequency reducing ratios of 4 and 6, respectively. The frequency from this system is consequently 2083 cycles per second, and the output of this frequency is normally delivered through contacts of a double pole, double throw relay 30 to the input side of amplifier A—16.

The oscillator O—25 is coupled to the submultiple controlled frequency generator SMG—26 through an electric space discharge amplifier A—31 having its grid loosely coupled to a tuning coil 32 of the oscillator O—25. In this way considerable output current of 50,000 cycles can be obtained without danger of reaction on the oscillator from external circuits. A variable tuning condenser 33 is connected across the coil 32.

The oscillator O—25 is of the type described in Proceedings of the Institute of Radio Engineers, Vol. 16, No. 2, Feb. 1928, in connection with Figs. 3 to 8, pages 143 to 147 of our paper entitled "Precision determination of frequency". The oscillator has a resonant piezo-electric quartz crystal 38 connected in the grid circuit. The crystal is adjusted by lapping so that the frequency of the circuit controlled by it is 50,000 cycles exactly at a given operating temperature. Minute corrections if subsequently required can be made by means of a small variable condenser 35 in parallel with the crystal. As explained in the I. R. E. paper just mentioned, the preferred adjustment for condenser 35 is very nearly that value for which the change in frequency with capacity is zero. Under this condition the small changes in the electrical circuit caused by temperature variations have an entirely negligible effect on the frequency. A resistance 36 in the space current supply circuit of the oscillator reduces the applied plate voltage and thereby decreases the heating of the crystal above its surroundings, caused by energy dissipation in the crystal.

The submultiple frequency generator SMG—26 is of the type shown in Fig. 9 of our I. R. E. paper just mentioned. It comprises an oscillator O—40 for generating a low frequency, a harmonic-producer HG—41 for obtaining a harmonic of the low frequency which corresponds to the high frequency by which it is controlled, a modulator M—42 in the plate circuit of which is obtained a direct current, the amplitude of which is a function of the phase relation between the controlling high frequency current and the harmonic of the controlled low frequency current, and an output amplifier A—43 which prevents reaction of the load from deleteriously affecting the operation of the submultiple generator SMG—26. The direct current in the modulator plate circuit passes through a winding 44 on a core of magnetic material. A winding 45 on the core is included in the tuning circuit or oscillating circuit proper of the oscillator O—40. Variation of the direct current output of the modulator causes a variation in the inductance of the winding 45 by virtue of the magnetic saturation of the core. This action of the direct current from the modulator maintains the frequency of the low frequency oscillator O—40 at such a value that the current from the harmonic producer has exactly the same frequency as that from the standard oscillator O—25.

In operating, the low frequency oscillator O—40 is adjusted so that its frequency is exactly some submultiple, say one quarter, of the 50-kc. control frequency when the direct current in coil 44 has a certain mean value. If, then, anything occurs that tends to change the low frequency, the resulting phase shift between the harmonic of the low frequency and the 50-kc. control current from oscillator O—25 instantly causes a change in the direct current in coil 44 that opposes that tendency. The result is that, in spite of any large variations in the low frequency circuit, the frequency is maintained at an exact submultiple of the high frequency control, the only variation being a slight shift in phase with respect to the control current.

This submultiple frequency generator is disclosed and claimed in the application of W. A. Marrison, Serial No. 178,937, filed March 28, 1927.

The submultiple frequency generator SMG—27 differs from SMG—26 only in the frequency ratio at which it operates.

The scanning disc at the sending station may be driven by a direct current motor and a synchronous motor identically like the motors 9 and 10. The means for maintaining the speed of the D. C. motor and the disc sensibly constant may be identically like the means just described for maintaining the speed of motor 9 and disc 8 constant, i. e. may comprise a 50-kc. crystal controlled oscillator like O—25, an amplifier like A—31, submultiple controlled frequency generators like SMG—26 and SMG—27 operating at ratios of 4 and 6, and an amplifier like amplifier A—16 for amplifying the 2083 cycle current from the last submultiple frequency generator and delivering it to the synchronous motor. However, at the sending station, no relay corresponding to relay 30 need be provided. Instead, the submultiple frequency generator corresponding to SMG—27 may be connected directly to the amplifier corresponding to A—16.

Each of the 50-kc. oscillators may be such as to maintain its frequency constant within limits of one part in at least several million.

With the sending station in operation, to bring the receiving system into synchronism, the direct current motor 9 is started and its field rheostat 18′ manipulated so that the motor approaches the synchronous speed of motor 10, at which the frequency of the E. M. F. generated by motor 10 is equal to the constant frequency of the current delivered by amplifier A—16. If the speed is adjusted by rheostat 18′ so that these two frequencies are sufficiently alike, the machine 10 will pull into step under control of the constant frequency source, and will therefore be in step with the corresponding motor at the sending station.

Since there are 120 teeth in the rotor of the machine 10, the disc 8 can pull into synchronism at any one of 120 angular positions, whereas in order to obtain proper framing of the picture, the disc 8 should operate at a particular angular position with respect to the angular position of the scanning disc at the transmitter. For example, if the disc 8 at the receiving station is 180° away from proper angular space relation with respect to the scanning disc at the transmitter, the observer 13 will see the lower half of the image on top, a dark space representing the dividing line between pictures, and the upper half of the picture at the bottom. Similarly, if the disc 8 is 90° or one quarter of a revolution ahead of the scanning disc at the transmitter, the lower quarter of the picture will appear at the top and the upper three quarters of the picture at the bottom.

Therefore, since the disc 8 may pull into synchronism at any one of 120 angular positions, means are provided for stepping disc 8 either forward or backward a sufficient number of teeth to bring the disc at the receiving end into the correct phase relation with the disc at the transmitting end, so that the received image will be properly framed. This is accomplished by switching the input to the power amplifier A—16 from the final submultiple generator circuit SMG—27 to an independent auxiliary vacuum tube oscillator O—50 operating at 2083 cycles, by means of relay 30 operated from a key 51. A beat frequency indicator 55 is connected jointly to the submultiple generator SMG—27 and to the vacuum tube oscillator O—50 to indicate by the motion of a needle of a meter 56 the frequency difference between the two sources and also the relative phase at any instant. The switching operation should be performed at a definite phase position indicated by the position of the needle, in order to avoid the possibility of throwing the motor out of synchronism. This beat frequency indicator as shown consists of a balanced vacuum tube modulator 57 having conjugate input circuits and the differential meter 56 in the plate circuit.

An application of W. A. Marrison Serial No. 256,783, filed of even date with the original of this application, discloses a system comprising means for switching a load circuit from either of two oscillators to the other without unduly disturbing the operation of the system. The means there disclosed includes a beat frequency indicator in which a thermocouple and its heater, instead of a vacuum tube device such as the device 57, serves as a modulator for operating a meter corresponding to the meter 56. If desired, a thermocouple and heater, instead of the device 57, may similarly be used in the system of the present invention.

When the machine 10 is running under the control of the oscillator O—50, the number of beats or excursions of the needle of meter 56 correspond to the number of cycles—number of teeth—by which the rotor is advanced or retarded in rotation with respect to the current from the 50-kc. controlled circuit. When, by adjusting the frequency of oscillator O—50 with its tuning condenser 50', the picture has been brought approximately in frame, the input side of amplifier A—16 may be switched back to the crystal control taking care, of course, to perform the switching operation at the proper phase.

Since there are two and one-half control cycles during the motion of one scanning hole across the field, it is possible that the picture may be out of frame horizontally by as much as 0.2 of a frame. It is necessary, therefore, to adjust the phase of the 2083 cycles from the submultiple generator SMG—27 at the receiving end to agree with that used at the transmitting end. This is accomplished by means of two auxiliary condensers 60 and 61 connected in parallel with the condenser 35 across the crystal 34 itself. The condenser 60 is permanently connected. By disconnecting it temporarily by relay 62 controlled from key 63, the frequency of the crystal is increased. The condenser 61 may be connected temporarily by relay 64 controlled from key 65, thereby decreasing the frequency of the crystal. The main condenser 35 bridged across the crystal is, of course, accurately adjusted so that there is no drift to the picture. The use of the auxiliary condensers 60 and 61 avoids the necessity of altering the setting of this condenser to bring the picture accurately into frame; that is, to bring the two control currents accurately into phase with each other.

It is convenient to arrange the meter 56, the condenser 50', and the keys 51, 63 and 65 near together, as for example on a table or panel 66, in a location from which the received image can be observed.

The routine of operating the receiving system may be as follows: With the power amplifier A—16 connected to the crystal controlled circuits, the rotating machine 9 will be started in the usual fashion. Beats between the crystal controlled circuits and the oscillator O—50 will be observed on the meter 56, the frequency of the oscillator O—50 being adjusted by means of the condenser 50' to slow beats. If the picture is out of frame by any appreciable amount, the key 51 will be pressed throwing the control to the vacuum tube oscillator O—50. The picture will, therefore, begin to drift at an amount determined by the difference between the frequencies of the crystal controlled circuits and the vacuum tube oscillator. If the picture is very much out of frame, this drift may be made large by adjusting the condenser 50'. As the picture comes into frame the drift will be decreased and when the picture is nearly in frame the key 51 will be released, returning the control to the crystal circuits. If the picture is still out of frame by a small amount, one or the other of the keys 60 and 61 controlling the frequency of the crystal may be depressed. One key moves the picture to the right, the other moves it to the left. As indicated above, the adjustment of the variable condenser 35 across the crystal is such that the rate of drift is as small as possible. However, if noticeable displacements of the picture occur, the picture will then be reframed by means of the auxiliary condensers 60 and 61 controlled, of course, by the relays 62 and 64 and keys 63 and 65.

Any necessity for operation of keys 63 and 65 to complete the framing of the picture after it has been brought nearly in frame by the auxiliary oscillator, can be obviated by having the nominal frequency of the auxiliary oscillator so high that the framing of the picture can be completed by operation of that oscillator without finer control of the framing by condensers 60 and 61 when the control of motor 10 is switched to the crystal controlled circuits. A circuit arrangement for operating on this plan is indicated in Fig. 2, in which oscillator O—25 and amplifier A—31, submultiple frequency generators SMG—26 and SMG—27, beat frequency indicator 55 and switch 30 are as described above, but an auxiliary oscillator O—250 having its frequency variable above and below the value 50 kc. by an adjustable condenser 250', corresponds to the oscillator O—50 of Fig. 1. The beat frequency indicator has its input circuit connected to the auxiliary oscillator and the amplifier A—31, instead of to the auxiliary oscillator and the submultiple frequency generator SMG—27 as in Fig. 1. The switch 30 can connect the oscillator O—250 to control the speed of motor 10 through SMG—26, SMG—27, and A—16, so that by adjusting condenser 250' a motor can be synchronized with the scanning disc at the transmitter and the framing of the picture can be completed while the oscillator O—250 is controlling the motor. Then the switch 30 may be reversed to transfer the control of the motor to the crystal controlled oscillator O—25 and no further manipulation of the keys 63 and 65 will be required except to correct for any noticeable drift of the image which may occur after a time.

Although in the receiving system shown in the drawings the image is produced by a neon lamp 7 and a rotating disc 8, it will be apparent that, instead, there may be employed, for example, the grid type of receiver and rotating distributor described in pages 570 to 573 and 598 to 600 of the above mentioned publication in the Bell System Technical Journal and shown in Figs. 9 to 12 on pages 570 to 572 of that publication. The motor 9 would then drive the distributor brush and the motor 10 controlled as described above would maintain the motor 9 and the brush at the proper speed and in the proper angular relation to the scanning disc at the transmitter.

Specific values mentioned herein for frequency, speed, aperture spacings, numbers of motor poles, numbers of rotor teeth, etc. are given by way of example only, and the invention is not limited thereto.

This application is a division of application Serial No. 256,784, filed February 24, 1928.

What is claimed is:

1. In a tranmission system having stations, movable members at respective stations and means for driving said members at corresponding speeds of rotation comprising at each station a source of high frequency electrical oscillations of substantially the same frequency at respective stations, means at each station to derive from the respective source a current of relatively low frequency and to drive the movable member at that station in synchronism therewith whereby the members at the respective stations are driven at corresponding rates, and means at a station for introducing a phase change in the movable member thereat comprising means for effecting a momentary change in frequency of the source of high frequency oscillations thereat.

2. In combination, a source of high frequency waves, means for deriving therefrom waves of relatively low frequency, a movable member operated synchronously by said wave of low frequency, and means for making phase changes in said movable member comprising means for momentarily altering the frequency of said source of high frequency waves.

3. In combination with a movable member moving in cycles, a source of high frequency oscillations, means for deriving therefrom relatively low frequency waves, means for operating said movable member in synchronism with said low frequency waves, and means for changing the phase position of said movable member by amounts respectively small and large in comparison with a cycle of its movement, comprising means for momentarily shifting the frequency of said high frequency source to effect the small phase change, and means to change the frequency of the low frequency wave to effect the larger mentioned phase shift.

4. In a transmission system having stations, movable members at respective stations and means for driving said members at corresponding speeds of rotation comprising at each station a source of constant radio frequency electrical variations, means for deriving low frequency current from said source of current, and means for driving the movable member at that station in synchronism with said low frequency current whereby the members at the respective stations are driven at corresponding rates, and means at a station for introducing a phase change in the movable member thereat comprising means for effecting a momentary change in frequency of the source of constant radio frequency electrical variations.

5. A system comprising a movable member, means for driving said member at a constant speed, a second movable member, means for driving said second member, and control means for controlling the speed of said second member and the phase relation between said members, said control means comprising a synchronous dynamo-electric machine, a crystal controlled oscillator for developing a current of high frequency, submultiple frequency generating means connected to said oscillator and deriving a low frequency current for feeding said synchronous machine, an auxiliary variable frequency oscillator having a frequency of the same order as said crystal controlled oscillator, a beat frequency indicator connected to each of said oscillators, and means for transferring connection of the input side of said submultiple frequency generating means from the output circuit of said auxiliary oscillator to the output circuit of said crystal controlled oscillator and vice versa to adjust the phase of said second movable element.

6. The method of control of cyclically moving signaling elements at each of two stations, which elements are designed to operate at the same frequency of less than twenty-five cycles per second, which method comprises separately generating at both stations high frequency waves of the same frequency, said frequency being at least of the order of fifty thousand cycles per second, maintaining the frequency of said waves substantially constant independently of control from the other station, generating waves of lower frequency from each of said high frequency waves, bringing said elements nearly into a desired phase relation with respect to each other independently of said waves, then driving said elements under control of said lower frequency waves, respectively and varying the frequency of one of said high frequency waves by a small amount to bring said elements completely into said desired phase relation.

7. The method of controlling a translating device by a source of high frequency current and a source of low frequency current, which comprises connecting the low frequency source to said device and changing the frequency of said source at a rapid rate to effect a rough adjustment of the device, disconnecting said device from said source and connecting it to said other source of high frequency current, and varying the frequency of said high frequency source at a relatively slow rate to effect an accurate adjustment of the device.

8. In combination, a translating device, a low frequency source of cyclic variations having means for coarse adjustment of its frequency, a high frequency source of cyclic variations having means for relatively fine adjustment of its frequency, and means for controlling said device from said sources alternatively.

9. In combination, a circuit comprising a synchronous dynamo-electric machine, a low frequency oscillator having means for coarse adjustment of its frequency of oscillation, a crystal controlled oscillator generating a current of high frequency and having means for relatively fine adjustment of its frequency of oscillation, means for deriving a low submultiple frequency current from said crystal controlled oscillator to operate said machine, the nominal frequencies of said oscillators bearing a known relation to each other, and means for connecting said first mentioned oscillator to said circuit and for transferring connection of said circuit from said first mentioned oscillator to said means under control of said crystal controlled oscillator.

10. In combination, a rotatable element, means for driving said element, a dynamo-electric machine connected to said element, control means for operating said dynamo-electric machine to maintain said element at a substantially constant speed, said control means comprising a source of cyclically varying high frequency current having a normally constant frequency above the frequency of current which can be employed to operate a dynamo-electric machine and at least several thousand times the speed of said dynamo-electric machine, means for deriving from said high frequency source a current of relatively low frequency to operate said dynamo-electric machine, and means for changing the frequency of said high frequency source to adjust the speed of said dynamo-electric machine.

11. The method of controlling the movement of a cyclically movable element which comprises producing a high frequency current of normally constant frequency, deriving a low submultiple frequency current from said high frequency current, utilizing said low frequency current for controlling the movement of said cyclically movable element to normally maintain it at a constant speed determined by the frequency of said high frequency current, momentarily slightly increasing or decreasing the frequency of said high frequency current for bringing said cyclically movable element into a desired phase position, and then changing the frequency of said high frequency current accurately to its original constant frequency to change the speed of said movable element to its original constant speed.

12. In combination, a cyclically movable element, an oscillator producing a relatively high frequency current and comprising an electric discharge device, a plurality of reactance elements, one or more of which are normally associated with said electric discharge device for controlling the frequency of the current produced by said oscillator, means for deriving a low frequency current from said high frequency current, means for rotating said element in synchronism with said low frequency current, and means for momentarily increasing or decreasing the number of said reactance elements which are effectively associated with said electric discharge device for changing the phase of said cyclically movable element.

13. In combination, an element at one station to be maintained at a constant speed corresponding to the speed of another element at another station, a motor for driving said element at a constant speed, a source of high constant frequency current, means for deriving low frequency current from said high frequency current to energize said motor, means for temporarily increasing the frequency of said source to temporarily increase the speed of said element and means for temporarily decreasing the frequency of said source to temporarily decrease the speed of said element to permit said elements to be brought into their initial phase relation when there is a departure therefrom due to a slight difference in their normal speeds.

14. In combination, an element at one station to be maintained at a constant speed corresponding to the speed of another element at another station, a motor for driving said element at a constant speed, a source of high constant frequency current, means for deriving low frequency current from said high frequency current to energize said motor, and means for temporarily changing the frequency of said source by a fixed amount for changing the speed of said motor to bring said elements into their initial phase relation when there is a departure therefrom due to a slight difference in the normal speeds of said elements.

15. In combination, an element at one station to be maintained at a constant speed corresponding to the speed of another element at another station, a motor for driving said element at a constant speed, a source of high constant frequency current, means for deriving low frequency current from said high frequency current to energize said motor, and means for temporarily increasing or decreasing the frequency of said source by a fixed amount for changing the speed of said motor to bring said elements into their initial phase relation when there is a departure therefrom due to a slight difference in the normal speeds of said elements.

16. In combination, a dynamo-electric machine, a low frequency source of varying current having means for coarse adjustment of its frequency for operating said machine, a high frequency source of varying current having means for relatively fine adjustment of its frequency, means for operating said machine under control of said high frequency source, and means for controlling the speed of said dynamo-electric machine from said current sources.

In witness whereof, we hereunto subscribe our names this 19th and 20th days of May, 1930.

WARREN A. MARRISON.
JOSEPH W. HORTON.